(12) United States Patent
Yuan et al.

(10) Patent No.: US 12,126,840 B2
(45) Date of Patent: Oct. 22, 2024

(54) VIDEO PROCESSING METHOD AND APPARATUS, AND DEVICE, DECODER, SYSTEM AND STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Congrui Fu, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/072,821

(22) Filed: Dec. 1, 2022

(65) Prior Publication Data

US 2023/0100615 A1 Mar. 30, 2023

Related U.S. Application Data

(63) Continuation of application No. PCT/CN2020/101968, filed on Jul. 14, 2020.

(51) Int. Cl.
*H04N 13/383* (2018.01)
*G06T 3/4007* (2024.01)
(Continued)

(52) U.S. Cl.
CPC ........... *H04N 19/85* (2014.11); *G06T 3/4007* (2013.01); *G06T 3/4046* (2013.01);
(Continued)

(58) Field of Classification Search
CPC .... H04N 19/85; H04N 13/156; H04N 19/172; H04N 19/31; H04N 19/46; G06T 3/4007;
(Continued)

(56) References Cited

U.S. PATENT DOCUMENTS 10,552,944 B2 2/2020 Wang
11,189,014 B2 * 11/2021 Ma ......................... G06T 3/4053
(Continued)

FOREIGN PATENT DOCUMENTS

CN 106791927 A 5/2017
CN 107563965 A 1/2018
(Continued)

OTHER PUBLICATIONS

First Office Action of the Indian application No. 202227073675, issued on Mar. 2, 2023.
(Continued)

*Primary Examiner* — Gims S Philippe
(74) *Attorney, Agent, or Firm* — BAYES PLLC

(57) ABSTRACT

Disclosed are a video processing method and apparatus, and a device, a decoder, a system and a storage medium, applied to a video device. The method comprises: obtaining a video sequence of a first resolution, the video sequence comprising at least one video frame; and inputting the video sequence into a super-resolution network model to obtain a target video sequence of a second resolution, wherein the super-resolution network model at least comprises a first sub-network model and a second sub-network model, the first sub-network model is used for improving the resolution of the video sequence, and the second sub-network model is used for improving the quality of at least one image frame in the output result of the first sub-network model.

18 Claims, 10 Drawing Sheets

Encoder side

Decoder side

(51) Int. Cl.
*G06T 3/4046* (2024.01)
*G06T 3/4053* (2024.01)
*H04N 13/156* (2018.01)
*H04N 19/172* (2014.01)
*H04N 19/31* (2014.01)
*H04N 19/46* (2014.01)
*H04N 19/85* (2014.01)

(52) U.S. Cl.
CPC ......... *G06T 3/4053* (2013.01); *H04N 13/156* (2018.05); *H04N 19/172* (2014.11); *H04N 19/31* (2014.11); *H04N 19/46* (2014.11)

(58) Field of Classification Search
CPC ....... G06T 3/4046; G06T 3/4053; G06T 5/60; G06T 5/70; G06T 2207/10016; G06T 2207/20084
USPC .......................................................... 348/43
See application file for complete search history.

(56) References Cited

U.S. PATENT DOCUMENTS

| | | | |
|---|---|---|---|
| 11,544,815 B2* | 1/2023 | Potapov | G06T 3/4053 |
| 11,599,979 B2* | 3/2023 | El-Khamy | G06V 30/2504 |
| 2019/0095795 A1 | 3/2019 | Ren et al. | |
| 2019/0114742 A1 | 4/2019 | Wang | |
| 2019/0138838 A1* | 5/2019 | Liu | G06T 3/4053 |
| 2020/0162789 A1* | 5/2020 | Ma | H04N 21/440263 |
| 2020/0311871 A1 | 10/2020 | Yu et al. | |
| 2020/0327702 A1* | 10/2020 | Wang | G06T 9/002 |
| 2021/0027426 A1 | 1/2021 | Ma et al. | |
| 2021/0166350 A1* | 6/2021 | Wang | G06F 18/251 |
| 2021/0209731 A1* | 7/2021 | Li | G06T 3/4046 |
| 2022/0222776 A1* | 7/2022 | Porikli | G06T 7/248 |
| 2023/0269395 A1* | 8/2023 | Yang | H04N 19/61 375/240.21 |

FOREIGN PATENT DOCUMENTS

| | | |
|---|---|---|
| CN | 109949255 A | 6/2019 |
| CN | 110136055 A | 8/2019 |
| CN | 110428378 A | 11/2019 |
| CN | 110705699 A | 1/2020 |
| CN | 111161152 A | 5/2020 |
| CN | 111369475 A | 7/2020 |
| JP | 2019164618 A | 9/2019 |

OTHER PUBLICATIONS

Hsiao Pai-Heng et al: "Video Enhancement via Super-Resolution Using Deep Quality Transfer Network", Mar. 11, 2017 (Mar. 11, 2017), SAT 2015 18th International Conference, Austin, TX, USA, Sep. 24-27, 2015; [ Lecture Notes in Computer Science; Lect. Notes Computer], Springer, Berlin, Heidelberg, pp. 184-200, XP047407319, ISBN: 978-3-540-74549-5, [retrieved on Mar. 11, 2017].
Extended European Search Report in the European application No. 20945341.4, mailed on May 22, 2023.
International Search Report in the international application No. PCT/CN2020/101968, mailed on Apr. 19, 2021.
Written Opinion of the International Search Authority in the international application No. PCT/CN2020/101968, mailed on Apr. 19, 2021.
Xiaoyu Xiang et al, "Zooming Slow-Mo: Fast and Accurate One-Stage Space-Time Video Super-Resolution", 2020 IEEE/CVF Conference on Computer Vision and Pattern Recognition (CVPR), Jun. 2020, DOI: 10.1109/CVPR42600.2020.00343, the whole document. 10 pages.
First Office Action of the Japanese application No. 2022-581541, issued on May 24, 2024. 10 pages with English translation.
Kui Jiang et al, "Edge-Enhanced GAN for Remote Sensing Image Superresolution", IEEE Transactions on Geoscience and Remote Sensing, (Mar. 29, 2019), DOI: 10.1109/TGRS.2019.2902431, the whole document. 14 pages.
Muhammad Haris et al, "Space-Time-Aware Multi-Resolution Video Enhancement", 2020 IEEE/CVF Conference on Computer Vision and Pattern Recognition (CVPR), Jun. 16, 2020-Jun. 18, 2020, DOI: 10.1109/CVPR42600.2020.00293, the whole document. 10 pages.
Jinbo Zhao et al, "Light Field Image Compression via CNN-Based EPI Super-Resolution and Decoder-Side Quality Enhancement", IEEE Access, DOI: 10.1109/Access.2019.2930644, Jul. 23, 2019, the whole document. 16 pages.
First Office Action of the Korean application No. 10-2022-7045271, issued on Jun. 17, 2024. 13 pages with English translation.

\* cited by examiner

VIDEO PROCESSING METHOD AND APPARATUS, AND DEVICE, DECODER, SYSTEM AND STORAGE MEDIUM

CROSS-REFERENCE TO RELATED APPLICATION

This is a continuation of International Application No. PCT/CN2020/101968 filed on Jul. 14, 2020, the disclosure of which is hereby incorporated by reference in its entirety.

BACKGROUND

With the continuous development of the video industry chain and continuous breakthrough in the computer technology, an information propagation mode using a video as a carrier has been widely applied. Compared with general texts and pictures, a video includes a relatively large amount of data. In addition, with the rapid development of the imaging device, in some scenarios using an ultra-high-definition video, the amount of data included in the ultra-high-definition video is too large. When the video is stored or transmitted, it is often necessary to compress the video due to the limitations of memory capacities and network bandwidth. However, the picture quality of the compressed video is always degraded to varying degrees.

In order to alleviate the contradiction between the amount of data and the picture quality, improving a video compression algorithm and post-processing the compressed videos are important directions for video technology research. However, in the existing relevant technical solutions, either the algorithm complexity is low, but the quality improvement effect is not obvious; or the quality improvement effect is obvious, but the algorithm complexity is too high, which does not facilitate to solve the problems, such as the picture quality loss and video picture rate degradation, caused during a process of video processing and compression.

SUMMARY

Embodiments of the disclosure relate to the technical field of video coding and decoding, and provide a video processing method and apparatus, a device, a decoder, a system and a storage medium, which may not only improve the picture quality and picture rate of a video but also enhance the coding and decoding efficiency.

The technical solutions of the embodiments of the disclosure may be implemented as follows.

According to a first aspect, an embodiment of the disclosure provides a video processing method, applied to a video device. The method includes the following operations.

A video of a first resolution is obtained. The video includes at least one video picture.

The video is inputted into a Super-Resolution (SR) network model to obtain a target video of a second resolution.

The SR network model at least includes a first sub-network model and a second sub-network model. The first sub-network model is used for improving the resolution of the video. The second sub-network model is used for improving picture quality of at least one picture in an output result of the first sub-network model.

According to a second aspect, an embodiment of the disclosure provides a video processing apparatus, applied to a video device. The video processing apparatus includes an acquisition unit and a processing unit.

The acquisition unit is configured to obtain a video of a first resolution. The video includes at least one video picture.

The processing unit is configured to input the video into an SR network model to obtain a target video of a second resolution.

The SR network model at least includes a first sub-network model and a second sub-network model. The first sub-network model is used for improving the resolution of the video. The second sub-network model is used for improving picture quality of at least one picture in an output result of the first sub-network model.

According to a third aspect, an embodiment of the disclosure provides a video device. The video device includes a memory and a processor.

The memory is configured to store a computer program executable on the processor.

The processor is configured to execute the method described in the first aspect when running the computer program.

According to a fourth aspect, an embodiment of the disclosure provides a computer storage medium. The computer storage medium stores a computer program. The computer program, when being executed by a first processor, implements the method described in the first aspect.

According to a fifth aspect, an embodiment of the disclosure provides a decoder. The decoder includes a general decoder and a video processing apparatus.

The general decoder is configured to decode a bitstream to obtain a video of a first resolution.

The video processing apparatus is configured to input the video into an SR network model to obtain a target video of a second resolution.

The SR network model at least includes a first sub-network model and a second sub-network model. The first sub-network model is used for adjusting the resolution of the video. The second sub-network model is used for adjusting picture quality of at least one picture in an output result of the first sub-network model.

According to a sixth aspect, an embodiment of the disclosure provides a video system. The video system includes an encoder and a decoder. The encoder includes a pre-processing apparatus and a general encoder. The decoder includes a general decoder and a video processing apparatus.

The pre-processing apparatus is configured to receive an input video of a second resolution, and then pre-process the received input video to obtain a video of a first resolution.

The general encoder is configured to perform video compression on the video to generate a bitstream, and transmit the bitstream to a standard decoder.

The general decoder is configured to decode the bitstream to obtain the video of the first resolution.

The video processing apparatus is configured to input the video into an SR network model to obtain a target video of the second resolution.

The SR network model at least includes a first sub-network model and a second sub-network model. The first sub-network model is used for improving the resolution of the video. The second sub-network model is used for improving picture quality of at least one picture in an output result of the first sub-network model.

The embodiments of the disclosure provide a video processing method and apparatus, a device, a decoder, a system and a storage medium. A video of the first resolution is obtained, and the video includes at least one video picture. The video is inputted into an SR network model to obtain the target video of the second resolution. The second resolution is higher than the first resolution. The SR network model at least includes the first sub-network model and the second sub-network model. The first sub-network model is used for improving the resolution and picture rate of the video. The second sub-network model is used for improving picture quality of each picture in the output result of the first sub-network model. In this way, the technical solutions of the disclosure use an SR network design, so that the problems, such as the picture quality loss and picture rate degradation, caused during the existing video compression can be solved, and furthermore, use one network (i.e., the SR network model) to simultaneously improve the resolution and picture rate of video images. Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

DETAILED DESCRIPTION

In order to understand the features and technical contents of the embodiments of the disclosure in more detail, the implementation of the embodiments of the disclosure are described in detail below with reference to the drawings, which are for reference only and are not intended to limit the embodiments of the disclosure.

With the increasing social needs and continuous progress of science and technology, the multimedia information industry is rapidly developed, and the requirements for the quality and number of videos are getting higher, resulting in a surge of video data. Since the amount of data of an uncompressed video is huge, it is inevitable to perform high-efficient compression on the video for storage and transmission network limitations. However, the picture quality of the compressed videos is always degraded to varying degrees. In order to alleviate the contradiction between the amount of data and the picture quality, improving a compression algorithm and post-processing the compressed videos are two commonly-used independent solutions, both of which are important research directions for video technology.

Figure 1:
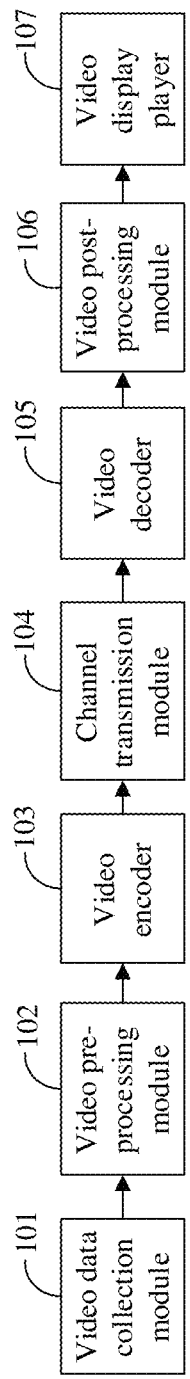
FIG. 1 is a schematic flowchart of a video processing process according to an embodiment of the disclosure.

FIG. 1 is a schematic flowchart of a video processing process according to an embodiment of the disclosure. As illustrated in FIG. 1, data collection is first performed by a video data collection module 101 to obtain an input video; then the input video is subjected to related processing by a video pre-processing module 102, and then encoded by a video encoder 103 to generate a bitstream; the bitstream is transmitted to a video decoder 105 by means of a channel transmission module 104, and then the video decoder 105 decodes the bitstream and obtains a video; and related processing is performed on the video by a video post-processing module 106 to recover an original input video, and then the original input video is played on a video display player 107. That is to say, FIG. 1 illustrates a video processing process and a position of the video post-processing module 106 in the overall video compression processing solution. When video pre-processing is performed by means of the video pre-processing module 102, due to limitations such as bandwidths and bitrates, the picture rate of the input video may be adjusted, for example, dropping pictures, so as to reduce the picture rate of the input video. In addition, the picture quality is degraded during video compression and coding, and in this case, the video post-processing module 106 is important for improving picture quality of a video.

Figure 2:
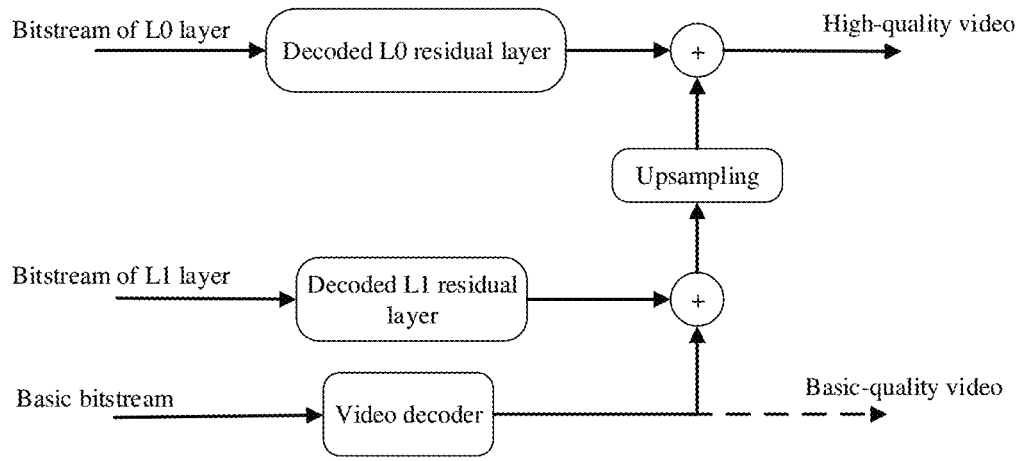
FIG. 2 is a schematic flowchart of another video processing process according to an embodiment of the disclosure.

FIG. 2 is a schematic flowchart of another video processing process according to an embodiment of the disclosure. As illustrated in FIG. 2, the video processing process is applied to an application scenario of Low Complexity Enhancement Video Coding (LCEVC). The application scenario already has a basic video encoder and a video decoder, but is expected to perform quality enhancement with lower complexity. An applicable platform of the application scenario is a hardware platform. The basic idea of LCEVC is multi-layered. First, there is a basic bitstream, and the bitstream may be decoded by using any video decoder that has been standardized, so as to obtain a video with basic quality. Then, a high-quality bitstream may be obtained by using more layers. For example, a bitstream of an L1 layer may be added, which is a residual layer, and then upsampling processing is performed after the bitstream of the L1 layer is added with the basic bitstream. Then, a bitstream of an L0 layer is added, which is a high-quality residual layer having more detailed time domain prediction information. Therefore, a high-quality video after reconstruction can be obtained after these layers are superimposed.

It should be understood that, for the loss of picture quality, the related video post-processing technology is mainly classified into an image enhancement-based post-processing algorithm and an image restoration-based post-processing algorithm. The image enhancement-based post-processing algorithm focuses on the enhancement of the subjective quality of an image. A typical algorithm is to perform filtering on a compressed image by a filter to enhance the visual effect of the image, and is mainly achieved by smoothing the distortion introduced by compression, rather than recovering a sample value of the image itself. Such algorithm is generally low in complexity, but is poor in improvement effect. The image restoration-based post-processing algorithm focuses on removing an effect generated by compression, including constructing a compression degradation model according to prior knowledge and an observation value on the video decoder side, then selecting a target function, and solving the target function by using an optimal method, for example, maximum posteriori probability, sparse representation or the like. Such algorithm is generally high in complexity, but is significant in improvement effect.

For the loss of the picture rate, the video post-processing technology is intended to improve the picture rate. Picture rate improvement is mainly classified into a block-matching-based picture rate improvement algorithm and a non-block-matching-based picture rate improvement algorithm. The non-block-matching-based picture rate improvement algorithm does not consider object motion in the image, but only adjacent linear interpolations. The algorithm has low operation complexity, but there are serious jitter and blurring phenomenons in video pictures. The block-matching-based picture rate improvement algorithm performs interpolation, by estimating a motion vector of an object, on the motion track of the object, so as to increase the picture rate of the video. In this way, the quality of the interpolated video picture is obviously improved, but the complexity is also increased.

Based on this, embodiments of the disclosure provide a video processing method. A video of a first resolution is obtained and includes at least one video picture. The video is inputted into an SR network model to obtain a target video of a second resolution. The SR network model at least includes a first sub-network model and a second sub-network model. The first sub-network model is used for improving the resolution of the video. The second sub-network model is used for improving picture quality of at least one picture in an output result of the first sub-network model. In this way, the technical solutions of the disclosure use an SR network design, so that the problems, such as the picture quality loss and picture rate degradation, caused during the existing video compression can be solved, and furthermore, use one network (i.e., the SR network model) to simultaneously improve the resolution and picture rate of video images. Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

Embodiments of the disclosure are described in detail below with reference to the drawings.

Figure 3:
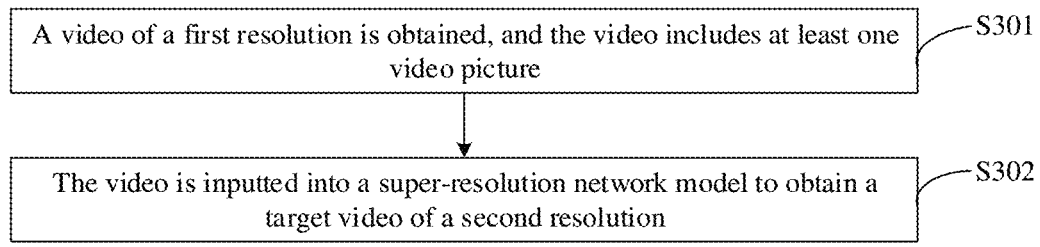
FIG. 3 is a schematic flowchart of a video processing method according to an embodiment of the disclosure.

In an embodiment of the disclosure, FIG. 3 is a schematic flowchart of a video processing method according to an embodiment of the disclosure. As illustrated in FIG. 3, the method may include the following operations.

At S301, a video of a first resolution is obtained. The video includes at least one video picture.

At S302, the video is inputted into an SR network model to obtain a target video of a second resolution.

The SR network model at least includes a first sub-network model and a second sub-network model. The first sub-network model is used for improving the resolution of the video. The second sub-network model is used for improving picture quality of at least one picture in an output result of the first sub-network model.

It is to be noted that, the video processing method is applied to a video processing apparatus or a video device integrated with the video processing apparatus. After the video of the first resolution is obtained, the SR network model may be used to perform resolution improvement, so as to obtain the target video of the second resolution. That is to say, a video with a low resolution and low picture rate may be reconstructed into a video with a high resolution and high picture rate by means of the SR network model.

It is further noted that, the resolution of the video includes at least one of a spatial resolution of the video or a temporal resolution of the video.

In this embodiment of the disclosure, the spatial resolution of the video may also be called the image resolution of the video, and the temporal resolution of the video may also be called the picture rate of the video. That is, for the resolution, the SR network model may not only be configured to improve the image resolution of the video, but also be configured to improve the picture rate of the video, or may even be configured to improve the image resolution and picture rate of the video simultaneously, which is not specifically limited in the embodiment of the disclosure.

Specifically, for the first sub-network model, if the first sub-network model is only configured to improve the image resolution of the video, in some embodiments, when the video is inputted into the SR network model to obtain the target video of the second resolution, the method may include the following operations.

Resolution improvement processing is performed on the video by means of the first sub-network model to obtain an initial video of the second resolution. The second resolution is higher than the first resolution.

Quality enhancement processing is performed on at least one picture in the initial video by means of the second sub-network model to obtain the target video.

For the first sub-network model, if the first sub-network model is only configured to improve the picture rate of the video, in some embodiments, the operation that the video is input into the SR network model to obtain the target video of the second resolution may include the following operations.

Resolution improvement processing is performed on the video by means of the first sub-network model, to obtain an initial video of the second resolution. The initial video includes at least one video picture and at least one interpolate picture.

Quality enhancement processing is performed on at least one picture in the initial video by means of the second sub-network model, to obtain the target video.

For the first sub-network model, if the first sub-network model is configured to simultaneously improve the image resolution and picture rate of the video, in some embodiments, the operation that the video is input into the SR network model to obtain the target video of the second resolution may include the following operations.

Resolution improvement processing is performed on the video by means of the first sub-network model, to obtain an initial video of the second resolution. The second resolution is higher than the first resolution, and the initial video includes at least one video picture and at least one interpolate picture.

Quality enhancement processing is performed on at least one picture in the initial video by means of the second sub-network model, to obtain the target video.

It is to be noted that, the SR network model may include at least the first sub-network model and the second sub-network model. The function of the first sub-network model is different from that of the second sub-network model. The first sub-network model may be a Branch Fusion Super Resolution Net (BFSRNet) model, which is mainly configured to perform image resolution and/or picture rate improvement on the video, so that the second resolution is higher than the first resolution, and the number of pictures corresponding to the obtained initial video is greater than the number of pictures corresponding to the video of the first resolution. That is, in order to improve the picture rate, at least one interpolate picture is newly added in the initial video. The second sub-network model may be a Quality Enhancement Net (QENet) model, which is mainly configured to perform quality enhancement on at least one picture in the video.

Further, when the first sub-network model may be configured to improve the picture rate of the video, in this case, the initial video further includes an interpolate picture. For the interpolate picture, if the picture quality of the interpolate picture is still poor after quality enhancement processing is performed by using the second sub-network model, and in such case, a third sub-network model may be further used to perform quality enhancement on the interpolate picture again.

In some embodiments, the second sub-network model may further include the third sub-network model. The method may further include the following operations.

Quality enhancement processing is performed on an interpolate picture in the target video by means of the third sub-network model, to obtain a target interpolate picture.

The target video is updated based on the target interpolate picture.

Herein, the third sub-network model is an Interpolate Frame Enhancement Net (IFENet) model, which is mainly configured to perform further quality enhancement on the interpolate picture obtained by approximate interpolation in the video.

That is to say, the principle of the embodiment of the disclosure is to design a branch fusion neural network model (i.e., the SR network model) to simultaneously improve the image resolution and picture rate of the video, that is, SR in space and time.

Figure 4:
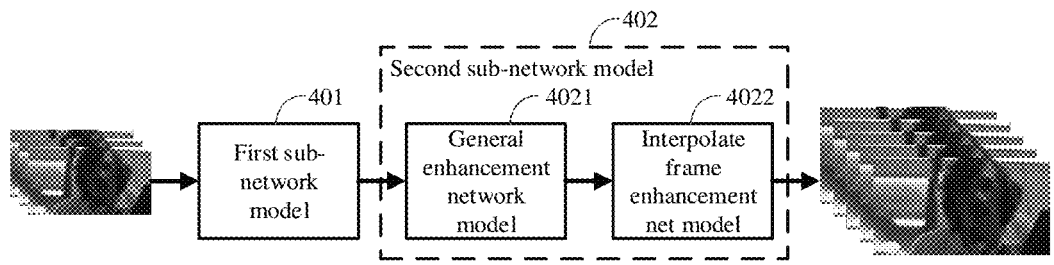
FIG. 4 is a schematic diagram of a composition structure of an SR network model according to an embodiment of the disclosure.

An entire structure of the SR network model may be illustrated in FIG. 4. The SR network model is composed of two sub-network models: the first sub-network model 401 (for example, BFSRNet model) and the second sub-network module 402 (for example, QENet model). The second sub-network model 402 may also be composed of a general enhancement network model 4021 and an Interpolate Frame Enhancement Net (IFENet) model 4022. The first sub-network model 401 is mainly to simultaneously perform SR on the video in three different dimensions (including two dimensions of the resolution and one dimension of the picture rate), and perform fusion by means of weighted average to obtain an SR output result. The second sub-network model 402 is mainly to improve the quality of at least one picture of the SR output result. Specifically, the general enhancement network model 4021 may perform quality improvement on the SR output result picture by picture. The IFENet model 4022 is to perform further quality enhancement on the interpolate picture obtained by approximate interpolation.

The first sub-network model, as a core for achieving an SR function, may include at least one branch module and a fusion module. In some embodiments, the operation that the video is processed by means of the first sub-network model to obtain the initial video of the second resolution may include the following operations.

An initial Epipolar Plane Image (EPI) image set in at least one dimension is constructed based on the video. The initial EPI image set in each dimension corresponds to one branch module.

The initial EPI image set in the at least one dimension is correspondingly inputted into the at least one branch module to obtain at least one target EPI image set.

Fusion processing is performed on the at least one target EPI image set by the fusion module, to obtain the initial video.

The resolution of each EPI image in the initial EPI image set is the first resolution, and the resolution of each EPI image in the target EPI image set is the second resolution.

It is to be noted that, taking the first sub-network model to be the BFSRNet model as an example, the BFSRNet model is the core for achieving the SR function, which may perform resolution improvement respectively from different dimensions of the video by means of a three-branch network and then perform fusion to obtain a final SR output result.

The three-branch design idea learns from the extraction of the EPI. In some embodiments the operation that the initial EPI image set in at least one dimension is constructed based on the video may include the following operations.

Video pictures of the video are arranged and superimposed to form a stereoscopic video set. The dimensions of the stereoscopic video set include a horizontal resolution dimension, a vertical resolution dimension and a picture rate dimension.

Based on one of the dimensions of the stereoscopic video set, after at least one slicing operation is performed on the stereoscopic video set in the one of the dimensions, at least one EPI image is obtained by extraction, and the at least one EPI image is composed into the initial EPI image set in the one of the dimensions.

Based on at least one dimension of the stereoscopic video set, the initial EPI image set in the at least one dimension is obtained.

Figure 5:
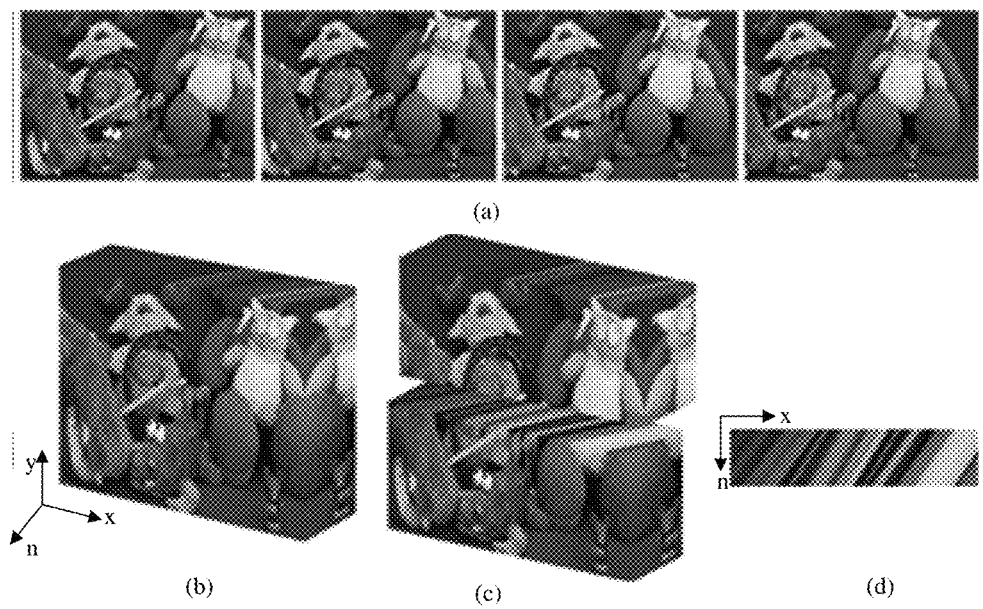
FIG. 5 is a schematic structure diagram for extracting an EPI image according to an embodiment of the disclosure.

That is to say, taking FIG. 5 as an example, FIG. 5 is a schematic structure diagram for extracting an EPI image according to an embodiment of the disclosure. As illustrated in FIG. 5, (a) illustrates a video, and the video includes a plurality of video pictures. The plurality of video pictures may be arranged and superimposed in a certain order, to form a stereoscopic video set illustrated in (b), which is expressed as V(x, y, n). The image resolution of each video picture is (H, W), and the number of the video pictures is N. Then, the slicing operation is performed on the stereoscopic video set by selecting any row along any axis as a tangent point. That is to say, samples at the same height of all images in the set are extracted, so that a series of images with linear characteristics are obtained. These images are EPI images. As illustrated in (c), the slicing operation is performed by selecting the ith row along the y-axis direction as the tangent point, so as to obtain the single EPI image illustrated in (d). In this way, after the slicing operation is performed on all rows in one of the axes, a series of EPI images can be obtained to form the initial EPI image set in the axis. One axis represents one dimension.

Figure 6:
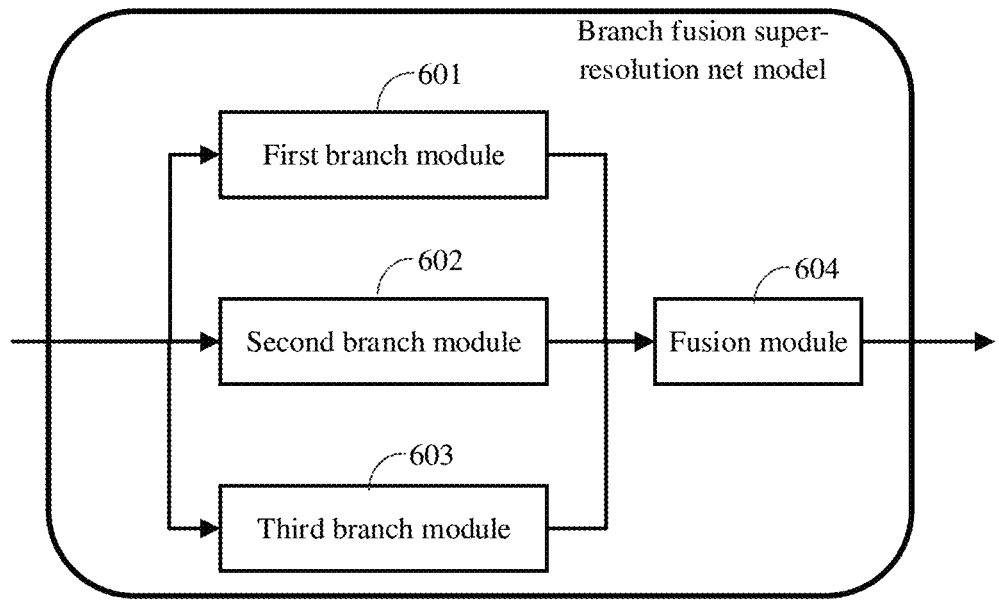
FIG. 6 is a schematic diagram of a detailed network structure of a BFSRNet model according to an embodiment of the disclosure.

It is to be understood that a detailed network structure of the BFSRNet model is illustrated in FIG. 6. The network model can simultaneously achieve an improvement effect on image resolution and picture interpolation of the video picture. In FIG. 6, an overall framework of the network model includes a first branch (denoted with B1_SRNet) module 601, a second branch (denoted with B2_SRNet) module 602, a third branch (denoted with B3_SRNet) module 603 and a fusion (denoted with Fusion) module 604. The three branch modules, i.e., the first branch module 601, the second branch module 602 and the third branch module 603, consider three dimensions in the stereoscopic video set. Each branch module may be regarded as an operation that is performed on initial EPI image sets of different dimensions in the stereoscopic video set. In this embodiment of the disclosure, the three branch modules use similar network structures, and only one or more parameters of a ConvTranspose3d layer in a three-dimensional convolution module are different. The ConvTranspose3d layer may be called a transposed 3D convolution layer, or may be called a 3D deconvolution layer, or the like. In this way, the three branch modules are inputted into the fusion module 604 after completing respective SR operations. In some embodiments, the operation that fusion processing is performed on the at least one target EPI image set by the fusion module to obtain the initial video may include the following operation.

Weighted average processing is performed on the at least one target EPI image set by the fusion module, to obtain the initial video.

That is to say, in this embodiment of the disclosure, fusion may be performed by means of simple weighted average, and then a final output result of the BFSRNet model is obtained after the fusion.

It is to be noted that, for each branch model, in some embodiments, the branch module may include an upsampling module and a convolution calculation module. The method may further include the following operations.

For the initial EPI image set in one of the dimensions, resolution improvement is performed on the initial EPI image set by the upsampling module, to obtain a first EPI image set.

Convolution calculation is performed on the first EPI image set by the convolution calculation module, to obtain a target EPI image set in the one of the dimensions.

The convolution calculation module may include a two-dimensional convolution (Conv2d) module, a three-dimensional convolution (Conv3d) module and a rectified convolution (ResDB) module. Convolution calculation is performed on the first EPI image set by means of these convolution models, so that the target EPI image set in one of the dimensions can be obtained.

Figure 7A:
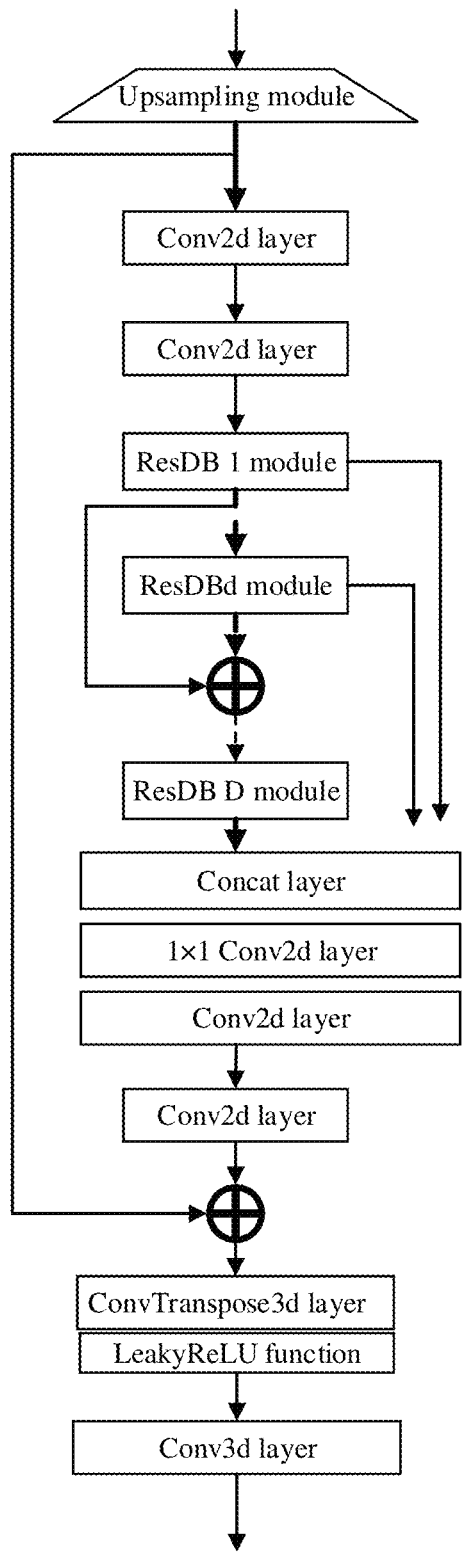
FIG. 7A is a schematic diagram of a composition structure of a branch module according to an embodiment of the disclosure.

Specifically, FIG. 7A is a schematic diagram of a composition structure of a branch module according to an embodiment of the disclosure. In FIG. 7A, the BFSRNet model first improves the resolution of the initial EPI image set in the current dimension by means of the upsampling module (that is, using a simple upsampling operator), and then performs processing by the convolution calculation module, which includes shallow feature extraction of two Conv2d layers and deep feature extraction of a series of ResDB modules (that is, ResDB 1 module, . . . , ResDB d module, . . . , and ResDB D module). Each ResDB module uses a residual learning mode, and feature concatenation is performed on the output of a plurality of ResDB modules by means of a connection (Concat) layer. Then, a 1×1 Conv2d layer is used to reduce the number of feature channels. In addition, residual reconstruction also uses the Conv2d layer to connect images obtained by the upsampling module through skip connection, so as to obtain the SR EPI image set. Finally, it is also required to use the 3D deconvolution of the ConvTranspose3d layer to improve the three-dimensional resolution of the stereoscopic video set, and then use the Conv3d layer to complete the SR reconstruction of the stereoscopic video set on the image resolution and picture rate. The ConvTranspose3d layer further includes a Leaky Rectified Linear Unit (Leaky ReLU) function.

Figure 7B:
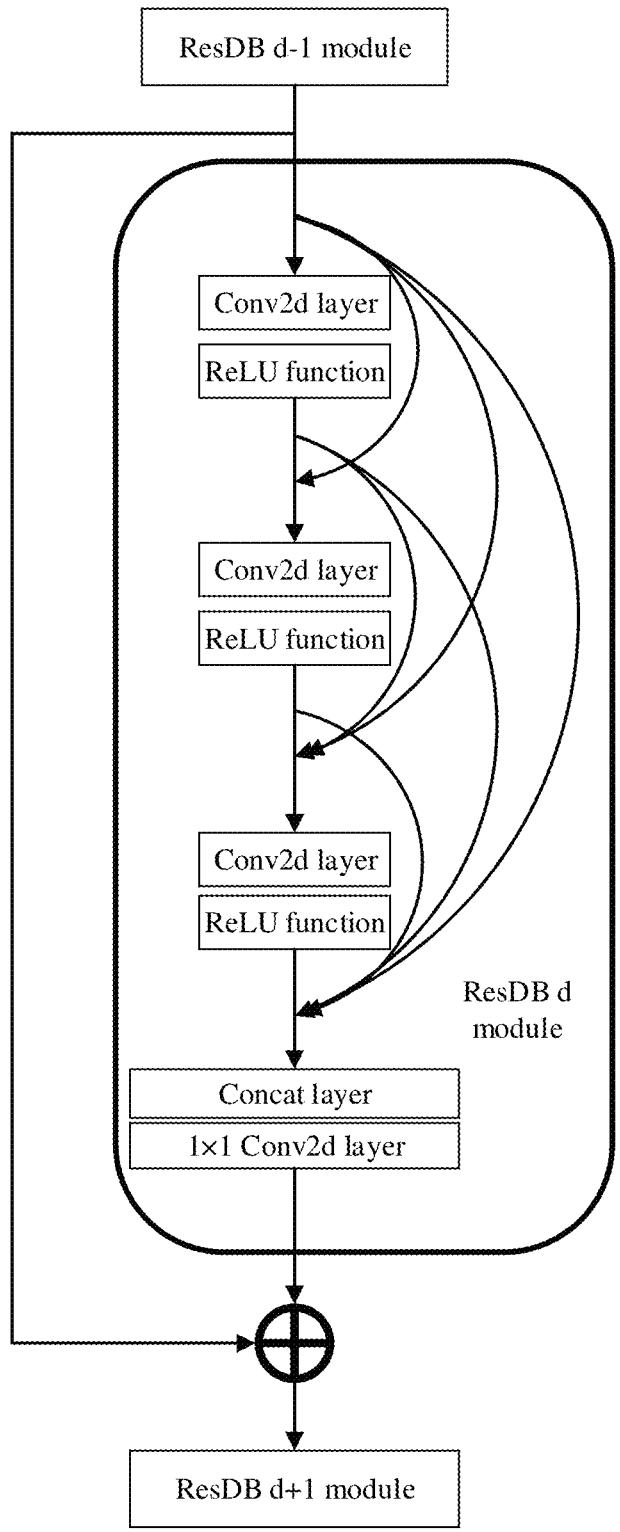
FIG. 7B is a schematic diagram of a composition structure of a ResDB module according to an embodiment of the disclosure.

In addition, a composition structure of a ResDB module is illustrated in FIG. 7B. In FIG. 7B, the ResDB module may be composed of three Conv2d layers with activation functions and one 1*1 Conv2d layer. Each ResDB module internally uses a dense connection, concatenates the outputs of the three Conv2d layers by the Concat layer, and then performs dimension reduction by the 1*1 Conv2d layer. The skip connection is used between the ResDB modules, i.e., the output of the previous module (that is, ResDB d−1 module) is superimposed with the output of the current module (that is, ResDB d module), and then the sum value is used as the input of the next module (that is, ResDB d+1 module).

It is to be noted that, the activation function may be a Rectified Linear Unit (ReLU) function, which is an activation function that is commonly used in an artificial neural network, and usually refers to a nonlinear function represented by a slope function and variants thereof. In addition, the Leaky ReLU function is a typical (and widely used) variant of the ReLu function. When the input value of the ReLu function is negative, the output is always 0, and a first-order derivative of the function is also always 0. In order to solve the disadvantage of the ReLu function, a leaky value is introduced in a negative half-interval of the ReLu function, which is called the Leaky ReLU function.

Further, after the image resolution and picture rate of the video are improved by means of the first sub-network model, the picture quality of the video picture needs to be further improved, and in this case, the second sub-network model, i.e., QENet model, is added. The QENet model may enhance the picture quality picture by picture, and may also enhance the picture quality of part of the pictures. That is to say, the QENet model is not fixed. Generally, the second sub-network model includes a general enhancement network model (that is, the QENet model described in this embodiment of the disclosure). The QENet model may use any current image video QENet model, for example, a Super- Resolution Convolutional Neural Network (SRCNN) model, an Artifacts Reduction Convolutional Neural Network (ARCNN) model, a Very Deep convolutional networks for Super-Resolution (VDSR) model, a Recurrent Back-Projection Network for Video Super-Resolution (RBPN) model and a Video Restoration with Enhanced Deformable Convolutional Networks (EDVR) model. Due to the requirement for the complexity of video processing apparatus design, it is suggested to select a network with desirable effect and low complexity. In the embodiments of the disclosure, it may be more appropriate to select the ARCNN model.

However, since the motion of part of objects in the video is relatively large, the interpolate picture interpolated during picture rate improvement meets a current motion trend, but the quality is poor. In this case, a simple network (i.e., the third sub-network model) may also be used to further improve the picture quality of the interpolate picture.

In some embodiments, the operation that quality enhancement processing is performed on the interpolate picture in the target video by means of the third sub-network model to obtain the target interpolate picture may include the following operations.

An interpolate picture to be processed and one or more preset video pictures are obtained.

The interpolate picture and the one or more preset video pictures are inputted into the third sub-network model, to obtain a target interpolate picture corresponding to the interpolate picture.

The one or more preset video pictures may be one or more video pictures adjacent to the interpolate picture. That is to say, the interpolate picture to be processed and the one or more preset adjacent video pictures are obtained, and then the obtained interpolate picture and the one or more preset adjacent video pictures are inputted into the third sub-network model, to obtain the target interpolate picture corresponding to the interpolate picture.

More specifically, the one or more preset video pictures may be two adjacent video pictures, that is, a previous video picture and a next video picture that are adjacent to the interpolate picture. In such case, in some embodiments, the operation that quality enhancement processing is performed on the interpolate picture in the target video by means of the third sub-network model to obtain the target interpolate picture may include the following operations.

Based on a displaying order of the target video, the interpolate picture to be processed, and the previous video picture and the next video picture that are adjacent to the interpolate picture are obtained.

The interpolate picture, the previous video picture and the next video picture are inputted into the third sub-network model, to obtain the target interpolate picture corresponding to the interpolate picture.

That is to say, after the interpolate picture to be processed is obtained, in combination with the one or more preset video pictures, or specifically the one or more adjacent video pictures, or even specifically the adjacent previous video picture and next video picture, the corresponding target interpolate picture is obtained by means of the third sub-network model. In the embodiments of the disclosure, for the expression "previous and next", one possible implementation corresponds to a displaying order of the video, or another possible implementation is, for a decoded video, an image order (that is, an output order) of the decoded video that may be outputted by a conventional decoder, such as an H.266/Versatile Video Coding (VVC) decoder and an H.265/High Efficiency Video Coding (HEVC) decoder.

Herein, the displaying order of the target video may be used as an order that is defined by the expression "previous and next", but this embodiment of the disclosure is not specifically limited thereto.

It is further to be noted that, the third sub-network model includes a first convolution module, a Convolutional Block Attention Module (CBAM), a second convolution module and an addition module. The first convolution module includes an activation function. The second convolution module does not include an activation function.

Further, in some embodiments, the number of the first convolution modules is one or more, the number of the CBAMs is one or more, the number of the second convolution modules is one, and the number of the addition modules is one. In this case, in some embodiments, the operation that the interpolate picture and the one or more preset video pictures are input into the third sub-network model to obtain the target interpolate picture corresponding to the interpolate picture may include the following operations.

Feature extraction is performed on the interpolate picture and the one or more preset video pictures by the one or more first convolution modules and the one or more CBAMs, to obtain feature images.

Convolution calculation is performed on the feature images by the second convolution module to obtain a residual image.

The enhanced interpolate picture and the residual image are superimposed by the addition module, to obtain the target interpolate picture corresponding to the interpolate picture.

In some embodiments, the operation that the interpolate picture, the previous video picture and the next video picture are input into the third sub-network model to obtain the target interpolate picture may include the following operations.

Feature extraction is performed on the interpolate picture, the previous video picture and the next video picture by the first convolution module and the CBAM, to obtain a feature image.

Convolution calculation is performed on the feature image by the second convolution module to obtain a residual image.

The enhanced interpolate picture and the residual image are superimposed by the addition module to obtain the target interpolate picture.

Figure 8:
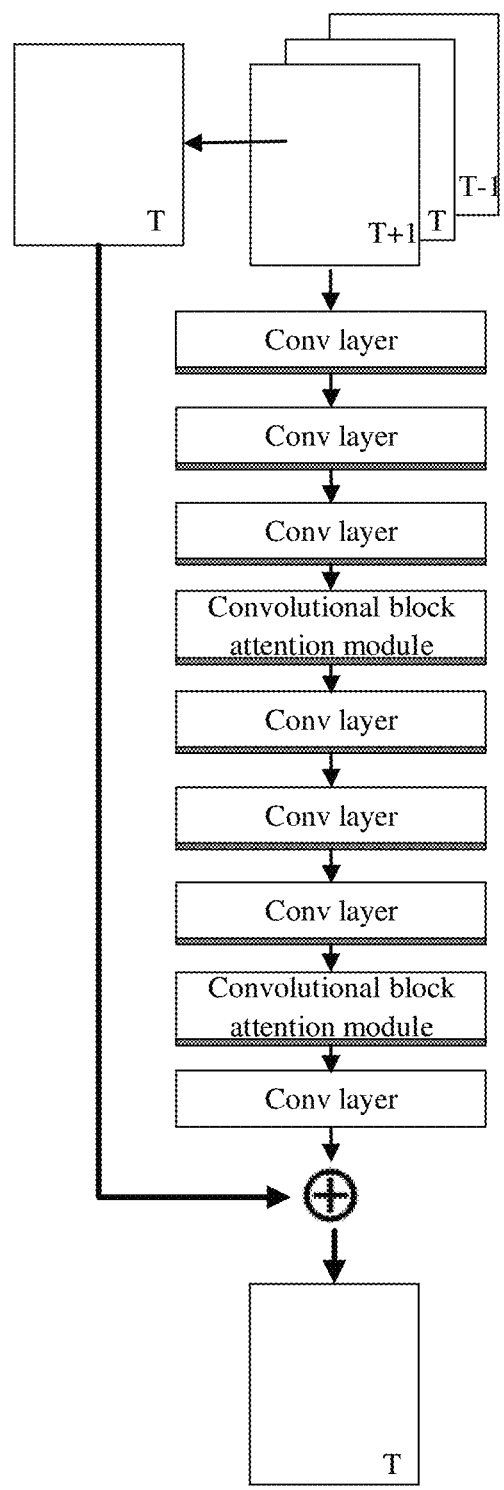
FIG. 8 is a schematic diagram of a detailed network structure of an IFENet model according to an embodiment of the disclosure.

That is to say, the second sub-network model may further include the third sub-network model for enhancing the picture quality. The third sub-network model uses the IFENet model as an example, and has the network structure illustrated in FIG. 8. In FIG. 8, the input of the network model is an interpolate picture on which quality improvement is required to be performed and the previous and next video pictures thereof, i.e., three image pictures in total. The network structure is composed of 7 Cony layers. The first six Cony layers are configured to perform feature extraction, and the last Cony layer is configured to perform residual reconstruction. In addition to the last Cony layer, each of the remaining six Cony layers is added with an activation function (that is, the ReLu function, filled in gray). The interpolate picture required to be improved and the residual image outputted by the network are superimposed, so that the final interpolate picture may be obtained. In addition, the CBAM is also added in the network structure of FIG. 8. The CBAM also carries the activation function, so that extracted features may be more accurate.

Figure 9A:
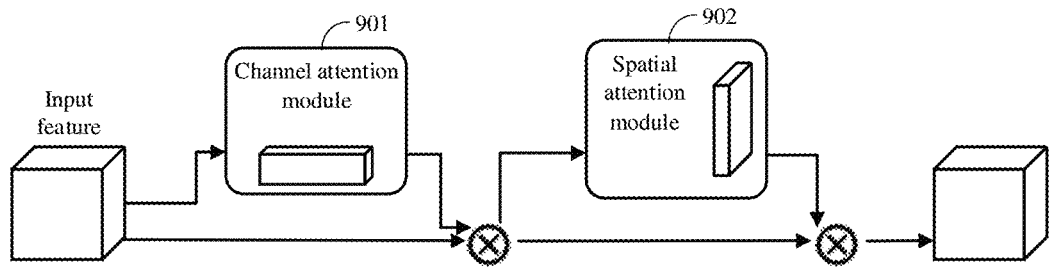
FIG. 9A is a schematic diagram of a composition structure of a convolutional block attention module according to an embodiment of the disclosure.

FIG. 9A provides an example of a composition structure of a CBAM. The CBAM may include a Channel Attention (CA) module 901 and a Spatial Attention (SA) module 902. After the input features successively pass through the CA module 901 and the SA module 902, the extracted features can be more accurate.

Figure 9B:
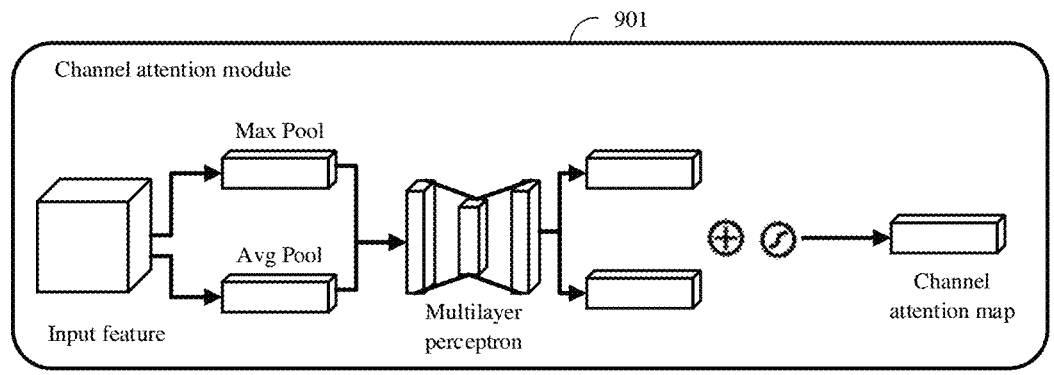
FIG. 9B is a schematic diagram of a composition structure of a channel attention module according to an embodiment of the disclosure.

The CA module 901 is specifically illustrated in FIG. 9B, the core idea of which is to use a relationship between channels of the features to generate a channel attention map. The operations include include the following. For the input feature (represented by F), maximum pooling (Max Pool) and average pooling (Avg Pool) are respectively performed to aggregate spatial information, to obtain two C-dimensional pooled feature images, which are represented by F_max and F_avg respectively. F_max and F_avg are sent to a Multilayer Perceptron (MLP) including a hidden layer, to obtain two 1×1×C channel attention map. Corresponding elements in the two channel attention maps obtained by the MLP are added and activated, to obtain a final channel attention map (represented by Mc).

Figure 9C:
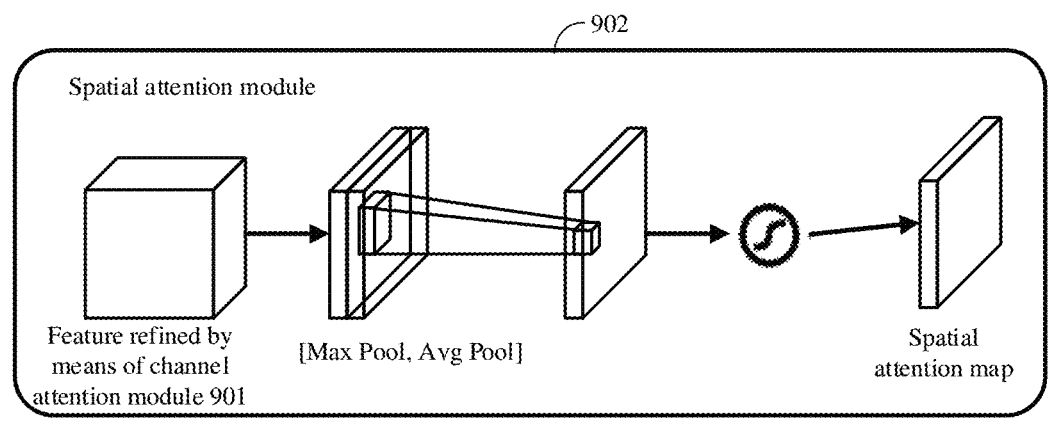
FIG. 9C is a schematic diagram of a composition structure of a spatial attention module according to an embodiment of the disclosure.

The SA module is specifically illustrated in FIG. 9C, the core idea of which is to use a spatial relationship between the features to generate a spatial attention map. The operations include the following. For a feature (represented by F) that is refined by the CA module 901, Max Pool and Avg Pool are performed first in a channel direction to obtain two two-dimensional feature maps (represented by F_avg and F_max), both of which are 1×H×W. Dimension concatenation is performed on the obtained two two-dimensional feature maps, so as to obtain a concatenated feature map. For the concatenated feature map, a convolution layer with the size of 7×7 is used to generate the spatial attention map (represented by Ms).

In combination with the network structure illustrated in FIG. 8, specific operations of the IFENet model include the following. For video pictures that have been enhanced picture by picture through the general enhancement network model, a picture requiring interpolate picture enhancement and the previous and next pictures thereof are concatenated as an input and sent to the IFENet model. By means of feature extraction composed of a plurality of Cony layers carrying the activation functions and the CBAM and a Cony layer with residual reconstruction, the residual image is obtained. The residual image and the original interpolate picture image requiring interpolate picture enhancement are superimposed, so as to finally obtain the target interpolate picture subjected to quality enhancement. That is to say, the input of the network structure is three pictures, i.e., the previous and next pictures associated with the interpolate picture and the interpolate picture, and the output is only one picture, i.e., the interpolate picture subjected to quality enhancement.

In this way, according to the first sub-network model and the second sub-network model, the SR network model in the embodiments of the disclosure can be obtained. In addition, in some embodiments, the method may further include the following operations.

A model parameter of the SR network model is determined.

According to the determined model parameter, the SR network model is constructed.

Further, in some embodiments, the operation that the model parameter of the SR network model is determined may include the following operations.

A training sample is obtained. The training sample at least includes a plurality of video pictures of the first resolution and a plurality of video pictures of the second resolution.

The neural network-based SR network model is trained by using the training sample to obtain the model parameter.

Further, in some embodiments, the operation that the model parameter of the SR network model is determined may include the following operation.

A bitstream is decoded to obtain the model parameter.

It is to be noted that, the training sample at least includes a plurality of video pictures of the first resolution and a plurality of video pictures of the second resolution, or includes a plurality of video images of the first resolution and a plurality of video images of the second resolution, and is used for performing model parameter training, so as to obtain the model parameter of the SR network model.

That is to say, for the model parameter of the SR network model, in one aspect, the model parameter may be obtained by performing model parameter training according to the training sample; and in the other aspect, model parameter training may be performed at the encoder side, then the trained model parameter is written in a bitstream, and the model parameter is directly obtained by parsing the bitstream at the decoder side. No limitations are made in this embodiment of the disclosure.

The embodiments of the disclosure are mainly intended to solve the existing problems, such as the picture quality loss and video picture rate degradation, caused during video compression. In addition, by downsampling during pre-processing and then restoration reconstruction during post-processing of the video, the existing problem of low coding and decoding efficiency can also be solved.

The embodiments of the disclosure are mainly based on the SR network model, which is applied to the video processing process.

The application of the SR network model in several scenario examples is described below.

(1) The SR network model is applied to a post-processing operation for video compression. As illustrated in FIG. 1, after data collection and video pre-processing are performed, the video encoder 103 performs coding to generate the bitstream; and then, at the decoding side, the video decoder 105 decodes the bitstream and reconstructs a video. Due to the loss of the picture quality and picture rate caused during the whole video processing, in this case, the SR network model in the embodiments of the disclosure may be applied to a post-processing position for the video, so that the picture quality of the video can be improved, and meanwhile, the picture rate can also be improved during post-processing in order to meet the requirement of the decoding side for the picture rate.

(2) The SR network model is applied to an LCEVC video compression scheme. As illustrated in FIG. 2, after obtaining a basic bitstream, the existing LCEVC scheme uses a plurality of layers to obtain a high-quality video. In the embodiments of the disclosure, the plurality of layers may be changed to one layer, i.e., after the basic bitstream is decoded to obtain a video with basic quality, the SR network model in the embodiments of the disclosure may be directly used to obtain the high-quality video.

Figure 10:
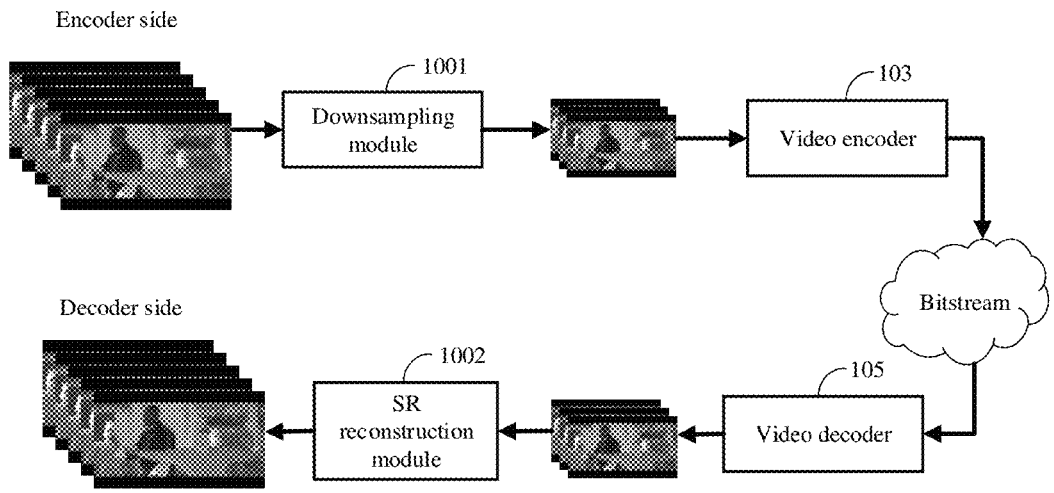
FIG. 10 is a schematic flowchart of another video processing process according to an embodiment of the disclosure.

(3) The SR network model is applied to a low-bitrate video compression scheme. The existing videos mostly have high resolutions and high picture rates. If the whole video is directly compressed, it may result in a low coding efficiency and large bitstream amount. In order to solve the problem, a low-bitrate compression scheme may be designed. As illustrated in FIG. 10, an original input video at the encoder side may be downsampled by a downsampling model 1001, to obtain a video with a low resolution and low picture rate. Then, the downsampled video is encoded by a video encoder 103 to generate the bitstream, for example, the bitstream is 01010001011101010. The bitstream is transmitted to the decoder side. A video decoder 105 decodes the bitstream to obtain the decoded video with the low resolution and low picture rate. Then, the video passes through an SR reconstruction module 1002 to obtain a video with a high resolution and high picture rate that is the same as the input video. In such case, the SR reconstruction module 1002 may use the SR network model in the embodiments of the disclosure to achieve SR reconstruction. That is to say, the core of the SR network model lies in SR reconstruction of the decoded video with a low resolution and low picture rate into the video with a high resolution and high picture rate that is the same as the input video.

Figure 11:
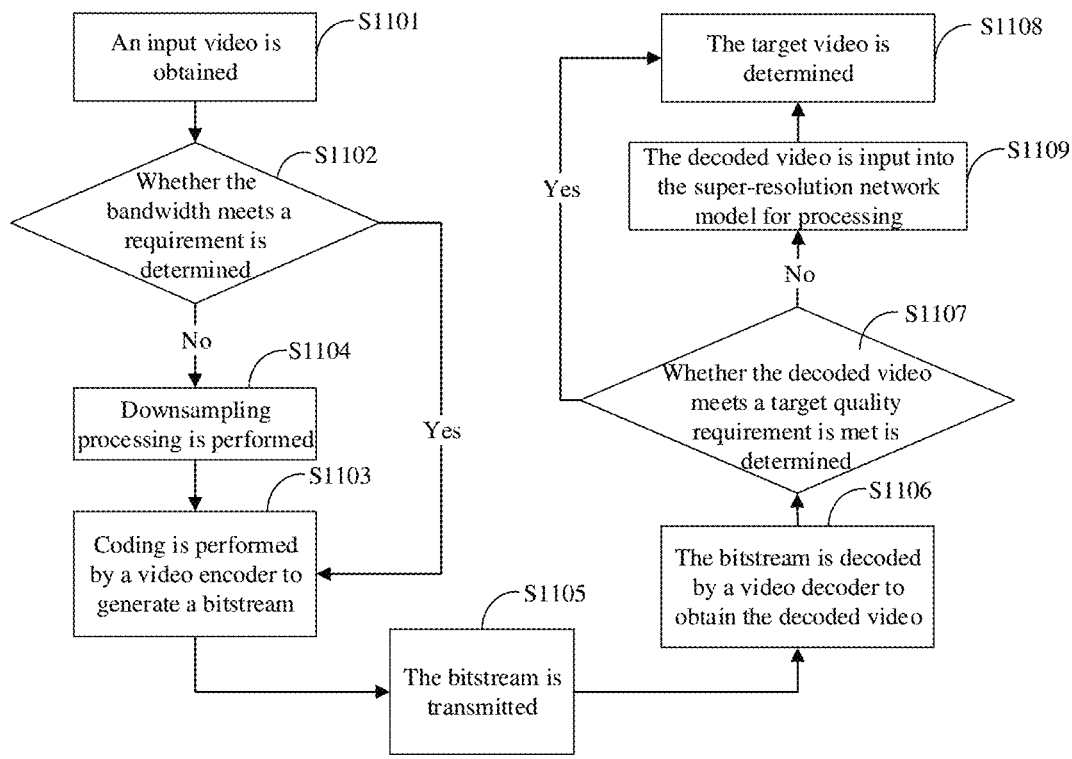
FIG. 11 is a schematic flowchart of another video processing process according to an embodiment of the disclosure.

(4) The SR network model is applied to a Scalable Video Coding (SVC) scheme. According to an actual application environment, the video may be divided into different portions for selecting whether to perform downsampling coding, perform several multiples of downsampling coding, or perform one-time coding to adapt various channels and terminals. A bandwidth limits the transmission of the video. When the bandwidth is insufficient, the coding bitstream of the video with different downsampling multiples is required to be transmitted and decoded, but in such case, the picture quality of the decoded video is poor. After decoding, the SR network model may be used to improve the picture quality. When the bandwidth slowly increases, the high-quality video may be directly obtained by transmitting and decoding the bitstream of the input video. Specifically, as illustrated in FIG. 11, the process may include the following operations.

At S1101, an input video is obtained.

At S1102, it is determined whether the bandwidth meets a requirement.

At S1103, if the determination result is Yes, coding is performed by a video encoder to generate a bitstream.

At S1104, if the determination result is No, downsampling processing is performed, and the operation at S1103 is executed.

At S1105, the bitstream is transmitted.

At S1106, the bitstream is decoded by a video decoder to obtain the decoded video.

At S1107, it is determined whether the decoded video meets a target quality requirement.

At S1108, if the determination result is Yes, the decoded video is determined as the target video.

At S1109, if the determination result is No, the decoded video is input into the SR network model for processing, and the output of the SR network model is determined as the target video.

That is to say, at the video encoder side, according to a bandwidth environment currently detected, it is determined whether the input video is required to be downsampled. If the input video is required to be downsampled, the corresponding downsampling multiple is selected and the input video is downsampled at the spatial resolution and the picture rate. Then, the existing video encoder is used to code, so as to obtain the bitstream. At the video decoder side, the bitstream may be decoded by the corresponding video decoder, and then inputted into the SR network model, so as to obtain the target video with the required resolution and picture rate.

It is to be understood that, the embodiments of the disclosure provide a branch fusion neural network structure to simultaneously improve the image resolution and picture rate of the video, that is, SR in space and time. In addition, the entire network structure may be composed of two sub-network models: the BFSRNet model and the QENet model. The QENet model herein may include the general enhancement network model and the IFENet model. That is to say, the entire network structure may be composed of three sub-network models: the BFSRNet model, the general enhancement network model and the IFENet model. Specifically, the BFSRNet model uses a network structure with three branches. Each branch network improves performance of the network by means of dense connection residual learning, and improves the image resolution and picture rate of the video from different dimensions of the stereoscopic video set. The IFENet model may use the interpolate picture and the adjacent previous and next pictures as the input, and in combination with the CBAM, further improve the quality of the interpolate picture.

It is to be noted that, there may be three application scenarios of the SR network model in the embodiments of the disclosure during video compression. The first application scenario is simply a post-processing of video compression to achieve SR in video images and improve the picture rate of the compressed and reconstructed video. The second application scenario is a low-bitrate video compression scheme designed based on the SR network model, in which before coding, downsampling is first performed on the video in space and time, and after decoding, corresponding SR improvement is performed, so that the bitrate can be greatly reduced. The third application scenario is to apply the SR network model to an inter prediction portion of a video coding standard, so that the number of reference pictures can be reduced, thereby improving the prediction accuracy.

In addition, in the embodiments of the disclosure, the network structure of the SR network model may be changed. Specifically, the three branches of the BFSRNet model may be appropriately deleted to meet the requirements of different computing capabilities at different scenarios. The network structure of the general enhancement network model usually uses an ARCNN model in the actual application, but is not limited herein, as long as the effect of enhancing picture quality of the video pictures can be met. The number of the Cony layers and the number of the CBAMs in the IFENet model are not limited, which may be appropriately increased and decreased. All changes may make a difference to the final picture quality of the video.

In this way, the low-bitrate compression scheme provided in the embodiments of the disclosure can greatly enhance the coding efficiency. Specifically, before compression and coding, downsampling is performed on the video in space and time, so that the data amount of the video required to be encoded is greatly reduced; and after decoding, the SR network model is used to perform corresponding upsampling, so as to recover the original video. Generally, the bitrate is greatly reduced, the coding efficiency is greatly improved, and the transmission bitstream is reduced. In addition, the SR network design used in the embodiments of the disclosure greatly enhances the picture quality and picture rate of the video. By applying the provided SR network model to the processing process of video compression, the quality of the compressed video can be improved greatly, and the video image SR and picture rate can be improved greatly. The SR network model provided in the embodiments of the disclosure is mainly to use one network to simultaneously achieve two effects of improving the SR and picture rate of the video picture image.

Exemplarily, the SR network model may be implemented on Nvidia GTX 1080Ti GPU by using a PyTorch platform, and an experimental training set and test set both use Vimeo-90K. Assuming that 4×SR is implemented on the video picture image and the picture rate is improved by 2 times, the specific experimental result is illustrated in Table 1 below. The first row represents an experimental result by only using the first sub-network model (i.e., the BFSRNet model); the second row represents an experimental result when the QENet model in the second sub-network model is added on the basis of the BFSRNet model; and the last row represents an experimental result when the IFENet model is also used on the basis of the BFSRNet model and the QENet model. In Table 1, a Peak Signal to Noise Ratio (PSNR) and Structural SIMilarity (SSIM) are used as average results of all pictures of the video, the SR PSNR/SSIM is equivalent to the average result of all pictures that simply achieve video picture image SR, and the PSNR/SSIM of the Video Frame Interpolation (VFI) is equivalent to an average result of all interpolate pictures. According to the results of Table 1, the general quality enhancement network model and the IFENet model added in the embodiments of the disclosure achieve a certain effect, and improve the PSNR and the SSIM.

TABLE 1

| Model used | PSNR | SSIM | SR SNR | SR SIM | VFI SNR | VFI SSIM |
|---|---|---|---|---|---|---|
| BFSRNet model | 32.57 | 0.912 | 34.01 | 0.932 | 30.40 | 0.881 |
| BFSRNet + QENet model | 32.78 | 0.917 | 34.25 | 0.937 | 30.58 | 0.886 |
| BFSRNet + QENet + IFENet model | 32.83 | 0.918 | 34.25 | 0.937 | 30.70 | 0.890 |

The embodiments provide a video processing method. A video of a first resolution is obtained and includes at least one video picture. The video is inputted into an SR network model to obtain a target video of a second resolution. The SR network model at least includes a first sub-network model and a second sub-network model. The first sub-network model is used for improving the resolution of the video. The second sub-network model is used for improving picture quality of at least one picture in an output result of the first sub-network model. In this way, the technical solutions of the disclosure use an SR network design, so that the problems, such as the picture quality loss and picture rate degradation, caused during the existing video compression can be solved, and furthermore, use one network (i.e., the SR network model) to simultaneously improve the resolution and picture rate of video images. Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

Figure 12:
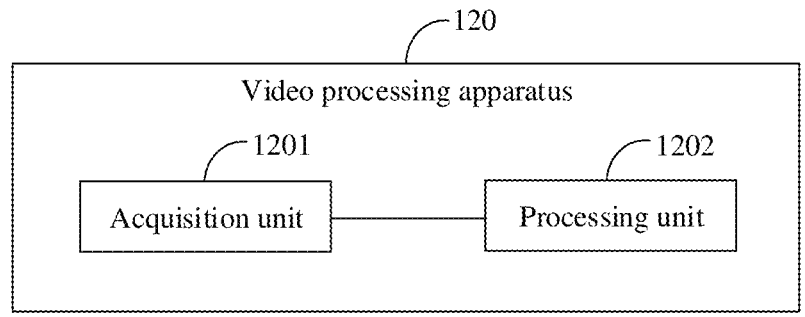
FIG. 12 is a schematic diagram of a composition structure of a video processing apparatus according to an embodiment of the disclosure.

In another embodiment of the disclosure, based on the same invention concept of the above embodiments, FIG. 12 is a schematic diagram of a composition structure of a video processing apparatus 120 according to an embodiment of the disclosure. As illustrated in FIG. 12, the video processing apparatus 120 may include an acquisition unit 1201 and a processing unit 1202.

The acquisition unit 1201 is configured to obtain a video of a first resolution. The video includes at least one video picture.

The processing unit 1202 is configured to input the video into an SR network model to obtain a target video of a second resolution.

The SR network model at least includes a first sub-network model and a second sub-network model. The first sub-network model is used for improving the resolution of the video. The second sub-network model is used for improving picture quality of at least one picture in an output result of the first sub-network model.

In some embodiments, the resolution of the video includes at least one of a spatial resolution of the video or a temporal resolution of the video.

In some embodiments, the processing unit 1202 is specifically configured to: perform resolution improvement processing on the video by means of the first sub-network model, to obtain an initial video of the second resolution, where the second resolution is higher than the first resolution; and perform quality enhancement processing on at least one picture in the initial video by means of the second sub-network model, to obtain the target video.

In some embodiments, the processing unit 1202 is specifically configured to: perform resolution improvement processing on the video by means of the first sub-network model, to obtain an initial video of the second resolution, where the initial video includes at least one video picture and at least one interpolate picture; and perform quality enhancement processing on at least one picture in the initial video by means of the second sub-network model, to obtain the target video.

In some embodiments, the first sub-network model is a BFSRNet model, and the second sub-network model is a QENet model.

In some embodiments, the second sub-network model further includes the third sub-network model.

The processing unit 1202 is further configured to perform quality enhancement processing on an interpolate picture in the target video by means of the third sub-network model to obtain a target interpolate picture, and update the target video based on the target interpolate picture.

In some embodiments, the third sub-network model is an IFENet model.

In some embodiments, the first sub-network model includes at least one branch module and a fusion module.

The processing unit 1202 is further configured to: construct an initial EPI image set in at least one dimension based on the video, where the initial EPI image set in each dimension corresponds to one branch module; correspondingly input the initial EPI image set in the at least one dimension into the at least one branch module, to obtain at least one target EPI image set; and perform fusion processing on the at least one target EPI image set by the fusion module, to obtain the initial video. The resolution of each EPI image in the initial EPI image set is the first resolution, and the resolution of each EPI image in the target EPI image set is the second resolution.

In some embodiments, the processing unit 1202 is further configured to: arrange and superimpose video pictures of the video to form a stereoscopic video set, where dimensions of the stereoscopic video set include a horizontal resolution dimension, a vertical resolution dimension and a picture rate dimension; based on one of the dimensions of the stereoscopic video set, obtain at least one EPI image after performing at least one slicing operation on the stereoscopic video set in the dimension, and compose the at least one EPI image into the initial EPI image set in the dimension; and based on at least one dimension of the stereoscopic video set, obtain the initial EPI image set in the at least one dimension.

In some embodiments, the branch module includes an upsampling module and a convolution calculation module.

The processing unit 1202 is further configured to: for an initial EPI image set in one of the dimensions, perform resolution improvement on the initial EPI image set by the upsampling module to obtain a first EPI image set; and perform convolution calculation on the first EPI image set by the convolution calculation module, to obtain the target EPI image set in the dimension.

In some embodiments, the processing unit 1202 is further configured to perform weighted average processing on the at least one target EPI image set by the fusion module, to obtain the initial video.

In some embodiments, the acquisition unit 1201 is further configured to obtain an interpolate picture to be processed and one or more preset video pictures.

The processing unit 1202 is further configured to input the interpolate picture and the one or more preset video pictures into the third sub-network model, to obtain a target interpolate picture corresponding to the interpolate picture.

In some embodiments, the one or more preset video pictures include two adjacent video pictures.

The acquisition unit 1201 is further configured to, based on a displaying order of the target video, obtain the interpolate picture to be processed, and a previous video picture and a next video picture that are adjacent to the interpolate picture.

The processing unit 1202 is further configured to input the interpolate picture, the previous video picture and the next video picture into the third sub-network model, to obtain the target interpolate picture corresponding to the interpolate picture.

In some embodiments, the third sub-network model includes a first convolution module, a CBAM, a second convolution module and an addition module. The first convolution module includes an activation function. The second convolution module does not include the activation function.

In some embodiments, the number of the first convolution modules is one or more, the number of the CBAMs is one or more, the number of the second convolution modules is one, and the number of the addition modules is one.

The processing unit 1202 is further configured to: perform feature extraction on the interpolate picture and the one or more preset video pictures by the one or more first convolution modules and the one or more CBAMs to obtain feature images; perform convolution calculation on the feature images by the second convolution module to obtain a residual image; and superimpose the enhanced interpolate picture and the residual image by the addition module, to obtain the target interpolate picture corresponding to the interpolate picture.

In some embodiments, the processing unit 1202 is further configured to determine a model parameter of the SR network model, and construct the SR network model according to the determined model parameter.

In some embodiments, the acquisition unit 1201 is further configured to obtain a training sample. The training sample at least includes a plurality of video pictures of the first resolution and a plurality of video pictures of the second resolution.

The processing unit 1202 is further configured to train the neural network-based SR network model by using the training sample, to obtain the model parameter.

In some embodiments, the acquisition unit 1201 is further configured to decode a bitstream to obtain the model parameter.

It is to be understood that, in the embodiment, "unit" may be part of a circuit, part of a processor, or part of a program or software, and of course, may be a module, and may also be non-modular. In addition, the components in the embodiment may be integrated into one processing unit, or each unit may exist alone physically, or two or more than two units may be integrated into one unit. The above integrated unit can be implemented in the form of hardware, or implemented in the form of a software functional module.

When being implemented in form of software functional module and sold or used not as an independent product, the integrated unit may be stored in a computer-readable storage medium. Based on such an understanding, the technical solutions of the embodiment substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) or a processor to execute all or part of the operations of the method in each embodiment. The storage medium includes: various media capable of storing program codes such as a U disk, a mobile Hard Disk Drive (HDD), a Read-Only Memory (ROM), a Random Access Memory (RAM), a magnetic disk or an optical disk.

In another embodiment of the disclosure, the embodiment provides a computer storage medium, applied to a video processing apparatus 120. The computer storage medium stores a computer program. The computer program, when being executed by at least one processor, implements operations of the method described in any one of the above embodiments.

Figure 13:
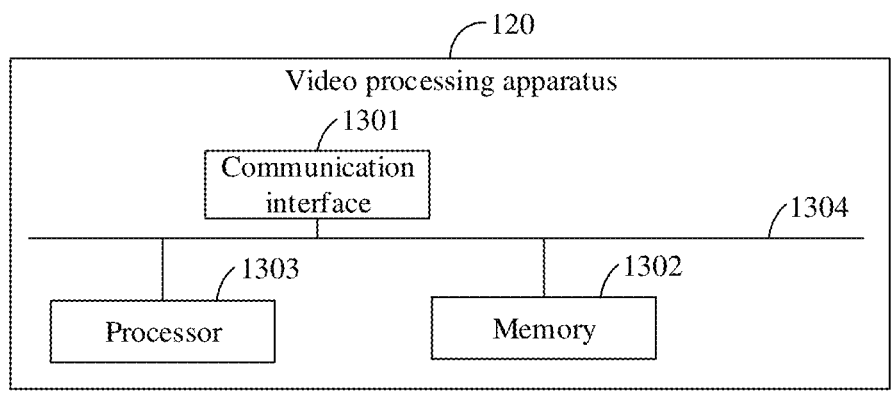
FIG. 13 is a schematic diagram of a hardware structure of a video processing apparatus according to an embodiment of the disclosure.

Based on the composition of the video processing apparatus 120 and the computer storage medium, FIG. 13 illustrates an example of a specific hardware structure of the video processing apparatus 120 according to an embodiment of the disclosure. The video processing apparatus 120 may include a communication interface 1301, a memory 1302 and a processor 1303. Components are coupled together through a bus system 1304. It can be understood that the bus system 1304 is configured to achieve connection communication between these components. In addition to a data bus, the bus system 1304 further includes a power bus, a control bus and a state signal bus. However, for the sake of clarity, various buses in FIG. 12 are labeled as the bus system 1304. The communication interface 1301 is configured to receive and transmit a signal in a process of receiving and sending information with other external network elements.

The memory 1302 is configured to store a computer program capable of running in the processor 1303.

The processor 1303 is configured to execute the following operations when running the computer program: obtaining a video of a first resolution, where the video comprises at least one video picture; and inputting the video into an SR network model to obtain a target video of a second resolution.

The SR network model at least includes a first sub-network model and a second sub-network model. The first sub-network model is used for improving the resolution of the video. The second sub-network model is used for improving picture quality of at least one picture in an output result of the first sub-network model.

It is to be understood that the memory 1302 in the embodiment of the disclosure may be a volatile memory or a non-volatile memory, or may include both the volatile and non-volatile memories. The non-volatile memory may be an ROM, a Programmable ROM (PROM), an Erasable PROM (EPROM), an Electrically EPROM (EEPROM) or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchronous link DRAM (SLDRAM) and a Direct Rambus RAM (DR RAM). The memory 1302 of a system and method described in the disclosure is intended to include, but not limited to, memories of these and any other proper types.

The processor 1303 may be an integrated circuit chip and has a signal processing capacity. During implementation, each operation of the method may be completed by an integrated logical circuit of hardware in the processor 1303 or an instruction in a software form. The above processor 1303 may be a general processor, a Digital Signal Processor (DSP), an Application Specific Integrated Circuit (ASIC), a Field-Programmable Gate Array (FPGA) or another Programmable Logic Device (PLD), a discrete gate or transistor logical device, and a discrete hardware component. Each method, operation and logical block diagram disclosed in the embodiments of the disclosure may be implemented or executed. The general processor may be a microprocessor or the processor may also be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM, and a register. The storage medium is located in the memory 1302. The processor 1303 reads information in the memory 1302 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the processor 1303 is further configured to, when running the computer program, execute operations of the method described in any one of the above embodiments.

Figure 14:
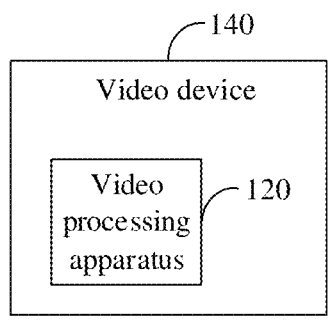
FIG. 14 is a schematic diagram of a composition structure of a video device according to an embodiment of the disclosure.

In some other embodiments of the disclosure, a video device in the embodiments of the disclosure may be a video displaying device, an encoder, a decoder, or the like. FIG. 14 is a schematic diagram of a composition structure of a video device according to an embodiment of the disclosure. As illustrated in FIG. 14, the video device 140 may include at least the video processing apparatus 120 described in any one of the foregoing embodiments.

Figure 15:
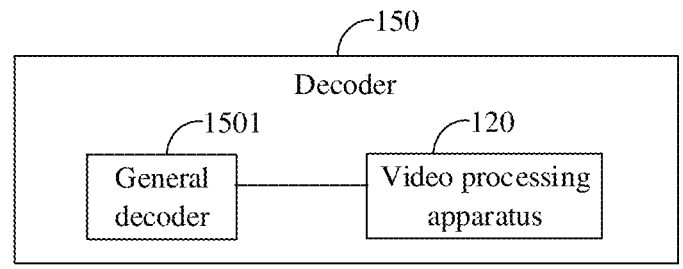
FIG. 15 is a schematic diagram of a composition structure of a decoder according to an embodiment of the disclosure.

In some other embodiments of the disclosure, FIG. 15 is a schematic diagram of a composition structure of a decoder according to an embodiment of the disclosure. As illustrated in FIG. 15, the decoder 150 may include at least a general decoder 1501 and the video processing apparatus 120 described in any one of the foregoing embodiments. The general decoder 1501 is the video decoder 105 described in the foregoing embodiments, that is, an H.266/VVC decoder, an H.265/HEVC decoder, or the like.

In some embodiments, the general decoder 1501 is configured to decode a bitstream to obtain a video of a first resolution.

The video processing apparatus 120 is configured to input the video into an SR network model to obtain a target video of a second resolution.

The SR network model at least includes a first sub-network model and a second sub-network model. The first sub-network model is used for adjusting the resolution of the video. The second sub-network model is used for adjusting the quality of at least one image picture in an output result of the first sub-network model.

In some embodiments, the general decoder 1501 is further configured to decode the bitstream to obtain a first indication flag bit. The first indication flag bit is used for indicating that the video of the first resolution is required to improve the spatial resolution of the video by means of the SR network model.

The video processing apparatus 120 is further configured to perform, according to the first indication flag bit, resolution improvement processing on the video by means of the first sub-network model, to obtain an initial video of the second resolution. The second resolution is higher than the first resolution.

In some embodiments, the general decoder 1501 is further configured to decode the bitstream to obtain a second indication flag bit. The second indication flag bit is used for indicating that the video of the first resolution is required to improve the temporal resolution of the video by means of the SR network model.

The video processing apparatus 120 is further configured to perform, according to the second indication flag bit, resolution improvement processing on the video by means of the first sub-network model, to obtain an initial video of the second resolution. The initial video includes at least one video picture and at least one interpolate picture.

In some embodiments, the general decoder 1501 is further configured to decode the bitstream to obtain a third indication flag bit. The third indication flag bit is used for indicating that the video of the first resolution is required to improve the picture quality of the video by means of the SR network model.

The video processing apparatus 120 is further configured to perform, according to the third indication flag bit, quality enhancement processing on at least one picture in the initial video by means of the second sub-network model, to obtain the target video.

In some embodiments, the general decoder 1501 is further configured to decode the bitstream to obtain a model parameter of the SR network model.

The video processing apparatus 120 is further configured to construct the SR network model according to the model parameter.

It is to be noted that functions of the video processing apparatus 120 in the foregoing embodiments are also applicable in the decoder 150. In this way, the decoder 150 uses an SR network design, so that the problems, such as the picture quality loss and picture rate degradation, caused during the existing video compression can be solved, and furthermore, use one network (i.e., the SR network model) to simultaneously improve the resolution and picture rate of video images. Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

Figure 16:
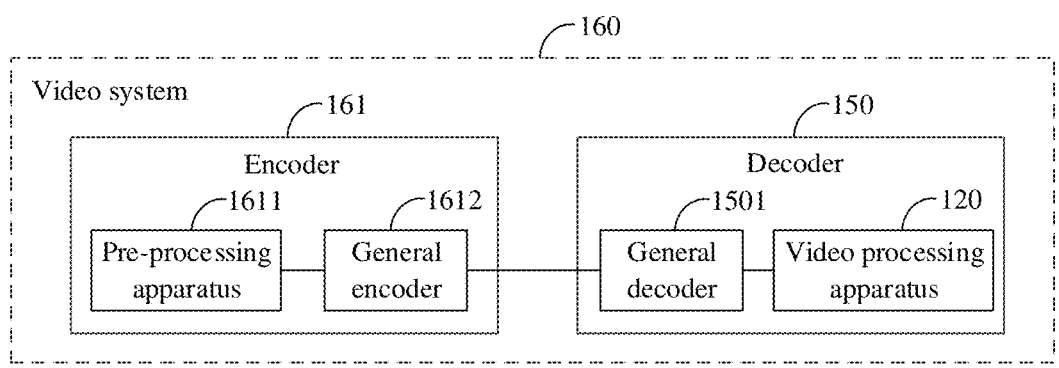
FIG. 16 is a schematic diagram of a composition structure of a video system according to an embodiment of the disclosure.

In some other embodiments of the disclosure, FIG. 16 is a schematic diagram of a composition structure of a video system according to an embodiment of the disclosure. As illustrated in FIG. 16, the video system 160 may include an encoder 161 and a decoder 150. The encoder 161 may include a pre-processing apparatus 1611 and a general encoder 1612. The decoder 150 may include a general decoder 1501 and the video processing apparatus 120 described in any one of the foregoing embodiments. The general encoder 1612 is the video encoder 103 described in the foregoing embodiments, that is, an H.266/VVC encoder, an H.265/HEVC encoder, or the like. The general decoder 1501 is the video decoder 105 described in the foregoing embodiments, that is, an H.266/VVC decoder, an H.265/HEVC decoder, or the like.

In some embodiments, the pre-processing apparatus 1611 is configured to receive an input video of a second resolution, and then pre-process the received input video to obtain a video of a first resolution.

The general encoder 1612 is configured to perform video compression on the video to generate a bitstream, and transmit the bitstream to a standard decoder.

The general decoder 1501 is configured to decode the bitstream to obtain the video of the first resolution.

The video processing apparatus 120 is configured to input the video into an SR network model to obtain a target video of a second resolution.

The SR network model at least includes a first sub-network model and a second sub-network model. The first sub-network model is used for improving the resolution of the video. The second sub-network model is used for improving picture quality of at least one image picture in an output result of the first sub-network model.

In some embodiments, the pre-processing apparatus 1611 is configured to perform downsampling processing on the received input video, to obtain the video of the first resolution; and set a first indication flag bit. The first indication flag bit is used for indicating that the video of the first resolution is required to improve the spatial resolution of the video by means of the SR network model.

The general encoder 1612 is further configured to write the first indication flag bit into the bitstream.

In some embodiments, the pre-processing apparatus 1611 is configured to perform picture rate adjustment processing on the received input video, to obtain the video of the first resolution; and set a second indication flag bit. The second indication flag bit is used for indicating that the video of the first resolution is required to improve the temporal resolution of the video by means of the SR network model.

The general encoder 1612 is further configured to write the second indication flag bit into the bitstream.

In some embodiments, the general encoder 1612 is further configured to perform video compression on the video, and then determine whether picture quality of the compressed video meets a preset picture quality standard; and set a third indication flag bit, and write the third indication flag bit into the bitstream. The third indication flag bit is used for indicating that the video of the first resolution is required to improve picture quality of the video by means of the SR network model.

In some embodiments, the pre-processing apparatus 1611 is further configured to obtain a training sample that at least includes a plurality of video pictures of the first resolution and a plurality of video pictures of the second resolution, and train the neural network-based SR network model by using the training sample to obtain a model parameter the SR network model.

The general encoder 1612 is further configured to write the model parameter into the bitstream.

In some embodiments, the general encoder 1501 is further configured to decode the bitstream to obtain a first indication flag bit.

The video processing apparatus 120 is further configured to, according to the first indication flag bit, perform resolution improvement processing on the video by means of the first sub-network model to obtain an initial video of the second resolution. The second resolution is higher than the first resolution.

In some embodiments, the general encoder 1501 is further configured to decode the bitstream to obtain a second indication flag bit.

The video processing apparatus 120 is further configured to, according to the second indication flag bit, perform resolution improvement processing on the video by means of the first sub-network model to obtain an initial video of the second resolution. The initial video includes at least one video picture and at least one interpolate picture.

In some embodiments, the general encoder 1501 is further configured to decode the bitstream to obtain a third indication flag bit.

The video processing apparatus 120 is further configured to, according to the third indication flag bit, perform quality enhancement processing on at least one picture in the initial video by means of the second sub-network model, to obtain the target video.

In some embodiments, the general decoder 1501 is further configured to decode the bitstream to obtain a model parameter of the SR network model.

The video processing apparatus 120 is further configured to construct the SR network model according to the model parameter.

It is to be noted that, functions of the video processing apparatus 120 in the foregoing embodiments are also applicable in the video system 160. In this way, the video system 160 uses an SR network design, so that the problems, such as the picture quality loss and picture rate degradation, caused during the existing video compression can be solved, and furthermore, use one network (i.e., the SR network model) to simultaneously improve the resolution and picture rate of video images. Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

It is to be noted that, in the disclosure, terms "include" and "contain" or any other variant thereof are intended to cover nonexclusive inclusions, so that a process, method, object or device including a series of elements not only includes these elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element.

The sequence numbers of the embodiments of the disclosure are adopted not to represent superiority and inferiority of the embodiments but only for description.

The methods disclosed in some method embodiments provided in the disclosure may be freely combined without conflicts to obtain new method embodiments.

The characteristics disclosed in some product embodiments provided in the disclosure may be freely combined without conflicts to obtain new product embodiments.

The characteristics disclosed in some method or device embodiments provided in the disclosure may be freely combined without conflicts to obtain new method embodiments or device embodiments.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

In the embodiments of the disclosure, the SR network model at least includes a first sub-network model and a second sub-network model. The first sub-network model is used for improving the resolution of the video. The second sub-network model is used for improving picture quality of at least one picture in an output result of the first sub-network model. In this way, by means of an SR network design, the problems, such as the picture quality loss and picture rate degradation, caused during the existing video compression can be solved, and furthermore, the resolution and picture rate of video images can be simultaneously improved by using the same network (i.e., the SR network model). Therefore, when the SR network model is applied to the processing process of video compression, the picture quality of the compressed video is improved significantly, and the resolution and picture rate of the video images are also improved significantly. In addition, the video may be downsampled before the compressed video is encoded, so that the data amount of the video to be coded can be reduced, and then when the SR network model is used after decoding, corresponding upsampling is performed, thereby reducing a bitrate, reducing a transmission bitstream, and improving the coding and decoding efficiency.

The invention claimed is:

1. A video processing method, applicable to a video device and comprising:
    obtaining a video of a first resolution, wherein the video comprises at least one video picture; and
    inputting the video into a Super-Resolution (SR) network model to obtain a target video of a second resolution;
    wherein the SR network model at least comprises a first sub-network model and a second sub-network model, the first sub-network model is used for improving the resolution of the video, and the second sub-network model is used for improving picture quality of at least one picture in an output result of the first sub-network model;
    wherein the second sub-network model further comprises a third sub-network model, and the method further comprises:
    performing resolution improvement processing on the video by the first sub-network model, to obtain an initial video of the second resolution, wherein the initial video comprises at least one video picture and at least one interpolate picture;
    performing quality enhancement processing on at least one video picture in the initial video by the second sub-network model, to obtain the target video;
    performing quality enhancement processing on an interpolate picture in the target video by the third sub-network model, to obtain a target interpolate picture; and
    updating the target video based on the target interpolate picture.

2. The method of claim 1, wherein the resolution of the video comprises at least one of a spatial resolution of the video or a temporal resolution of the video.

3. The method of claim 1, wherein
    the second resolution is higher than the first resolution.

4. The method of claim 3, wherein the first sub-network model comprises at least one branch module and a fusion module; and performing resolution improvement processing on the video by the first sub-network model, to obtain the initial video of the second resolution comprises:
    constructing, based on the video, an initial Epipolar Plane Image (EPI) image set in at least one dimension, wherein an initial EPI image set in each dimension corresponds to one branch module;
    correspondingly inputting the initial EPI image set in the at least one dimension into the at least one branch module, to obtain at least one target EPI image set; and
    performing fusion processing on the at least one target EPI image set by the fusion module, to obtain the initial video;
    wherein a resolution of each EPI image in the initial EPI image set is the first resolution, and a resolution of each EPI image in the target EPI image set is the second resolution.

5. The method of claim 4, wherein constructing, based on the video, the initial EPI image set in at least one dimension comprises:
    arranging and superimposing video pictures of the video, to form a stereoscopic video set, wherein dimensions of the stereoscopic video set comprise a horizontal resolution dimension, a vertical resolution dimension and a picture rate dimension;

based on one of the dimensions of the stereoscopic video set, obtaining at least one EPI image after performing at least one slicing operation on the stereoscopic video set in the one of the dimensions, and composing the at least one EPI image into the initial EPI image set in the one of the dimensions; and obtaining, based on at least one dimension of the stereoscopic video set, the initial EPI image set in the at least one dimension.

6. The method of claim 4, wherein the branch module comprises an upsampling module and a convolution calculation module; and the method further comprises:

for an initial EPI image set in one of the dimensions, performing resolution improvement on the initial EPI image set by the upsampling module, to obtain a first EPI image set; and performing convolution calculation on the first EPI image set by the convolution calculation module, to obtain a target EPI image set in the one of the dimension.

7. The method of claim 4, wherein performing fusion processing on the at least one target EPI image set by the fusion module, to obtain the initial video comprises:

performing weighted average processing on the at least one target EPI image set by the fusion module, to obtain the initial video.

8. The method of claim 1, wherein the first sub-network model is a Branch Fusion Super Resolution Net (BFSRNet) model, and the second sub-network model is a Quality Enhancement Net (QENet) model.

9. The method of claim 1, wherein the third sub-network model is an Interpolate Frame Enhancement Net (IFENet) model.

10. The method of claim 1, wherein performing quality enhancement processing on the interpolate picture in the target video by the third sub-network model, to obtain the target interpolate picture comprises:

obtaining an interpolate picture to be processed and one or more preset video pictures; and inputting the interpolate picture and the one or more preset video pictures into the third sub-network model, to obtain a target interpolate picture corresponding to the interpolate picture.

11. The method of claim 10, wherein the one or more preset video pictures comprise two adjacent video pictures, and performing quality enhancement processing on the interpolate picture in the target video by the third sub-network model, to obtain the target interpolate picture comprises:

obtaining, based on a displaying order of the target video, the interpolate picture to be processed, and a previous video picture and a next video picture that are adjacent to the interpolate picture; and inputting the interpolate picture, the previous video picture and the next video picture into the third sub-network model, to obtain the target interpolate picture corresponding to the interpolate picture.

12. The method of claim 10, wherein the third sub-network model comprises a first convolution module, a Convolutional Block Attention Module (CBAM), a second convolution module and an addition module, the first convolution module comprises an activation function, and the second convolution module comprises no activation function.

13. A video processing apparatus, applicable to a video device, and comprising:

an acquisition circuit, configured to obtain a video of a first resolution, wherein the video comprises at least one video picture; and a processing circuit, configured to input the video into a Super-Resolution (SR) network model to obtain a target video of a second resolution;

wherein the SR network model at least comprises a first sub-network model and a second sub-network model, the first sub-network model is used for improving the resolution of the video, and the second sub-network model is used for improving picture quality of at least one picture in an output result of the first sub-network model;

wherein the second sub-network model further comprises a third sub-network model, and the processing circuit is configured to:

perform resolution improvement processing on the video by the first sub-network model, to obtain an initial video of the second resolution, wherein the initial video comprises at least one video picture and at least one interpolate picture;

perform quality enhancement processing on at least one video picture in the initial video by the second sub-network model, to obtain the target video;

perform quality enhancement processing on an interpolate picture in the target video by the third sub-network model, to obtain a target interpolate picture; and update the target video based on the target interpolate picture.

14. A decoder, comprising:

a general decoder, configured to decode a bitstream to obtain a video of a first resolution; and a video processing apparatus, configured to input the video into a Super-Resolution (SR) network model to obtain a target video of a second resolution;

wherein the SR network model at least comprises a first sub-network model and a second sub-network model, the first sub-network model is used for adjusting the resolution of the video, and the second sub-network model is used for adjusting picture quality of at least one picture in an output result of the first sub-network model;

wherein the second sub-network model further comprises a third sub-network model, and the video processing apparatus is configured to:

perform resolution improvement processing on the video by the first sub-network model, to obtain an initial video of the second resolution, wherein the initial video comprises at least one video picture and at least one interpolate picture;

perform quality enhancement processing on at least one video picture in the initial video by the second sub-network model, to obtain the target video;

perform quality enhancement processing on an interpolate picture in the target video by the third sub-network model, to obtain a target interpolate picture; and update the target video based on the target interpolate picture.

15. The decoder of claim 14, wherein the general decoder is further configured to decode the bitstream to obtain a first indication flag bit, wherein the first indication flag bit is used for indicating that the video of the first resolution is required to improve a spatial resolution of the video by the SR network model; and the video processing apparatus is further configured to perform, based on the first indication flag bit, resolution improvement processing on the video by the first sub-network model, to obtain the initial video of the second resolution, wherein the second resolution is higher than the first resolution.

16. The decoder of claim 14, wherein
the general decoder is further configured to decode the bitstream to obtain a second indication flag bit, wherein the second indication flag bit is used for indicating that the video of the first resolution is required to improve a temporal resolution of the video by the SR network model; and
the video processing apparatus is further configured to perform, based on the second indication flag bit, resolution improvement processing on the video by the first sub-network model, to obtain the initial video of the second resolution.

17. The decoder of claim 14, wherein
the general decoder is further configured to decode the bitstream to obtain a third indication flag bit, wherein the third indication flag bit is used for indicating that the video of the first resolution is required to improve picture quality of the video by the SR network model; and
the video processing apparatus is further configured to perform, based on the third indication flag bit, quality enhancement processing on at least one picture in an initial video by the second sub-network model, to obtain the target video.

18. The decoder of claim 14, wherein
the general decoder is further configured to decode the bitstream to obtain a model parameter of the SR network model; and
the video processing apparatus is further configured to construct the SR network model based on the model parameter.

* * * * *